United States Patent
Mansour et al.

(10) Patent No.: US 12,010,071 B2
(45) Date of Patent: Jun. 11, 2024

(54) SYSTEM AND METHOD FOR FULL DUPLEX USING CODE MULTIPLEXING

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-Mobile Innovation LLC, Overland Park, KS (US)

( * ) Notice: Subject to any disclaimer, the term of this patent is extended or adjusted under 35 U.S.C. 154(b) by 0 days.

(21) Appl. No.: 17/518,716

(22) Filed: Nov. 4, 2021

(65) Prior Publication Data
US 2023/0133773 A1     May 4, 2023

(51) Int. Cl.
*H04W 72/044*     (2023.01)
*H04L 5/14*        (2006.01)

(52) U.S. Cl.
CPC ........... *H04L 5/14* (2013.01); *H04W 72/0466* (2013.01)

(58) Field of Classification Search
CPC ........... H04W 72/082; H04W 72/0446; H04W 72/0466
See application file for complete search history.

(56) References Cited

U.S. PATENT DOCUMENTS

| | | | |
|---|---|---|---|
| 6,195,327 B1* | 2/2001 | Lysejko | H04W 72/541 370/201 |
| 10,873,838 B2 | 12/2020 | Hwang et al. | |
| 2003/0026235 A1* | 2/2003 | Vayanos | H04J 13/20 370/342 |
| 2004/0235472 A1* | 11/2004 | Fujishima | H04L 5/0062 455/515 |
| 2013/0121189 A1* | 5/2013 | Bhattad | H04L 5/1484 370/252 |
| 2015/0358977 A1* | 12/2015 | Seo | H04W 72/00 455/452.1 |
| 2020/0136741 A1* | 4/2020 | Gharib | H04J 13/10 |

FOREIGN PATENT DOCUMENTS

WO    2020/168253 A1    8/2020

* cited by examiner

*Primary Examiner* — Benjamin Lamont
(74) *Attorney, Agent, or Firm* — Jones Robb, PLLC

(57) ABSTRACT

Systems, methods, and processing nodes for managing duplex communications in a network perform and/or comprise: setting an overlap threshold; comparing a first time division duplex (TDD) allocation corresponding to a first access node with a second TDD allocation corresponding to a second access node which neighbors the first access node and which utilizes a same frequency band as the first access node, thereby to determine a overlap amount; and in response to a determination that the overlap amount exceeds the overlap threshold, instructing the first access node to multiplex a downlink communication signal with an orthogonal code prior to transmitting the downlink communication signal.

20 Claims, 5 Drawing Sheets

SYSTEM AND METHOD FOR FULL DUPLEX USING CODE MULTIPLEXING

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Communications between the UE and the access node are duplex (bidirectional), including UE-to-access-node (uplink) communications and access-node-to-UE (downlink) communications. "Full duplex" refers to communication schemes in which uplink communications and downlink communications may occur simultaneously. In one implementation, full duplex communication may be realized using frequency-division duplexing (FDD), in which a portion of spectrum is divided into separate adjacent uplink and downlink components. For example, a 10 megahertz (MHz) wide channel may be divided into a 5 MHz uplink component and a 5 MHz downlink component. This division permits uplink and downlink signals to be communicated simultaneously using different frequencies.

In another implementation, full duplex communication may be effectively simulated using time-division duplexing (TDD), in which the portion of spectrum is kept whole and uplink and downlink symbols are sent in different timeslots. In each timeslot, a short burst of data is transmitted in the corresponding direction. The period between each timeslot is small, resulting in communication that is essentially simultaneous. Compared to FDD, TDD may result in double the bandwidth at the cost of a directional transmission rate that is one-half of the total channel transmission rate. TDD may be implemented as either static TDD (S-TDD) or dynamic TDD (D-TDD). In S-TDD, the ratio of uplink timeslots to downlink timeslots and their pattern is fixed and unchanging. In D-TDD, by contrast, the relative allocation of time slots between uplink and downlink and/or pattern of uplink and downlink timeslots may be changed, thus allowing for the network to handle changing conditions, asymmetric traffic needs, and the like.

Overview

Various aspects of the present disclosure relate to systems and methods of duplexing communications in a network, such as a telecommunications network including overlapping frequencies utilized by one or multiple network operators.

In one exemplary aspect of the present disclosure, a method of duplexing communications in a network comprises: setting an overlap threshold; comparing a first time division duplex (TDD) allocation corresponding to a first access node with a second TDD allocation corresponding to a second access node which neighbors the first access node and which utilizes a same frequency band as the first access node, thereby to determine a overlap amount; and in response to a determination that the overlap amount exceeds the overlap threshold, instructing the first access node to multiplex a downlink communication signal with an orthogonal code prior to transmitting the downlink communication signal.

In another exemplary aspect of the present disclosure, a system for duplex communication in a network comprises: a processing node; and a processor coupled to the processing node, the processor being configured to perform operations comprising: setting an overlap threshold; determining that a first access node and a second access node utilize a same frequency band; determining an overlap amount between a first time division duplex (TDD) allocation corresponding to the first access node and a second TDD allocation corresponding to the second access node; comparing the overlap amount to the overlap threshold; and in response to a determination that the overlap amount exceeds the overlap threshold, instructing the first access node to multiplex a downlink communication signal with an orthogonal code prior to transmitting the downlink communication signal.

In another exemplary aspect of the present disclosure, a processing node for managing duplex communications in a network is configured to perform operations comprising: comparing a first time division duplex (TDD) allocation corresponding to a first access node with a second TDD allocation corresponding to a second access node which neighbors the first access node and which utilizes a same frequency band as the first access node, thereby to determine a overlap amount; and in response to a determination that the overlap amount exceeds an overlap threshold, instructing the first access node to multiplex a downlink communication signal with an orthogonal code prior to transmitting the downlink communication signal.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
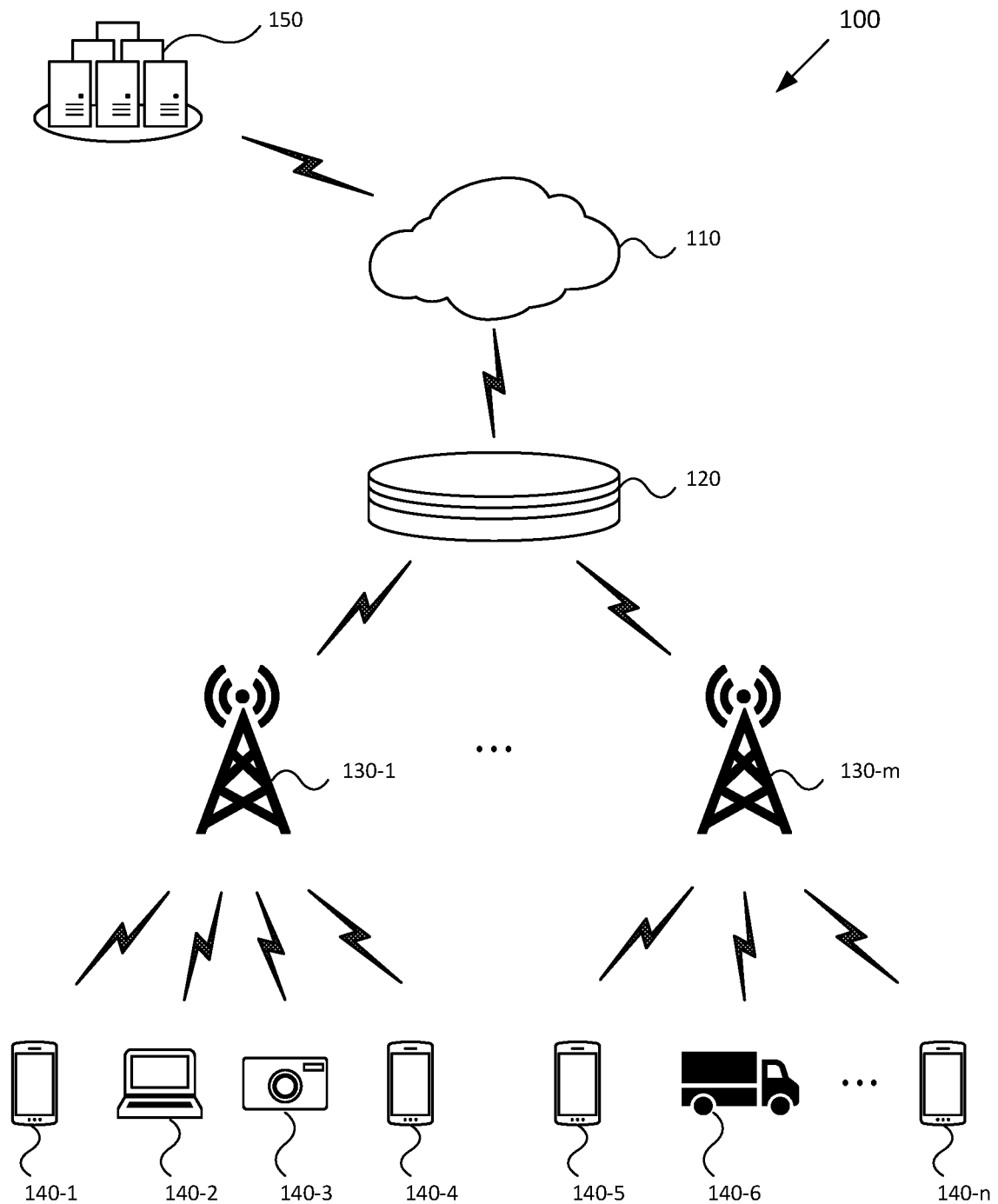
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, full duplex communication may be effectively simulated using TDD schemes. Moreover, in order to accommodate for changing conditions, asymmetric traffic needs, and so on, a D-TDD scheme may be implemented. D-TDD may be implemented on an access-node-by-access-node basis, such that different access nodes within the same network may implement different uplink/downlink schedules. Moreover, in many implementations the different access nodes implement communications on the same portion of the electromagnetic spectrum, whether the different access nodes are operating in the same or different RATs.

For example, 4G LTE communication utilizes frequencies below 6 gigahertz (GHz), and 5G NR communication utilizes frequencies below 6 GHz (Frequency Range 1) and above 24 GHz (Frequency Range 2). For frequencies below 6 GHz, overlap may exist between LTE and LTE communications, between NR and NR communications, and/or between LTE and NR communications. For frequencies above 24 GHz, overlap may exist between NR and NR communications. Because neighboring (or nearby) access nodes may implement different D-TDD schedules on the same frequencies, there may exist particular timeslots in which neighboring (or nearby) access nodes utilize the same frequency band in the same link direction. These instances may lead to increased interference between communications directed to/from different wireless devices and/or different access nodes. While the present disclosure describes interference and interference mitigation strategies in the context of two D-TDD schedules, in practice the present disclosure is also applicable to interference between a D-TDD schedule and an S-TDD schedule.

For purposes of illustration and explanation, various portions of this detailed description refer to implementations in a network including 4G and/or 5G RATs; however, the present disclosure is not so limited. The systems and methods described herein may be implemented in any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an LTE cloud platform and/or an NR cloud platform, may perform processing and forward results to the computing systems and devices 150 and/or the wireless devices 140. The core network 120, which may be an LTE core network and/or an NR core network, connects with the cloud platform 110 and the access nodes 130. For LTE communication, the core network 120 may be implemented on a fixed-function, hard-wired architecture. Examples of the core network and/ or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap, as will be described in more detail below with regard to FIG. 2.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
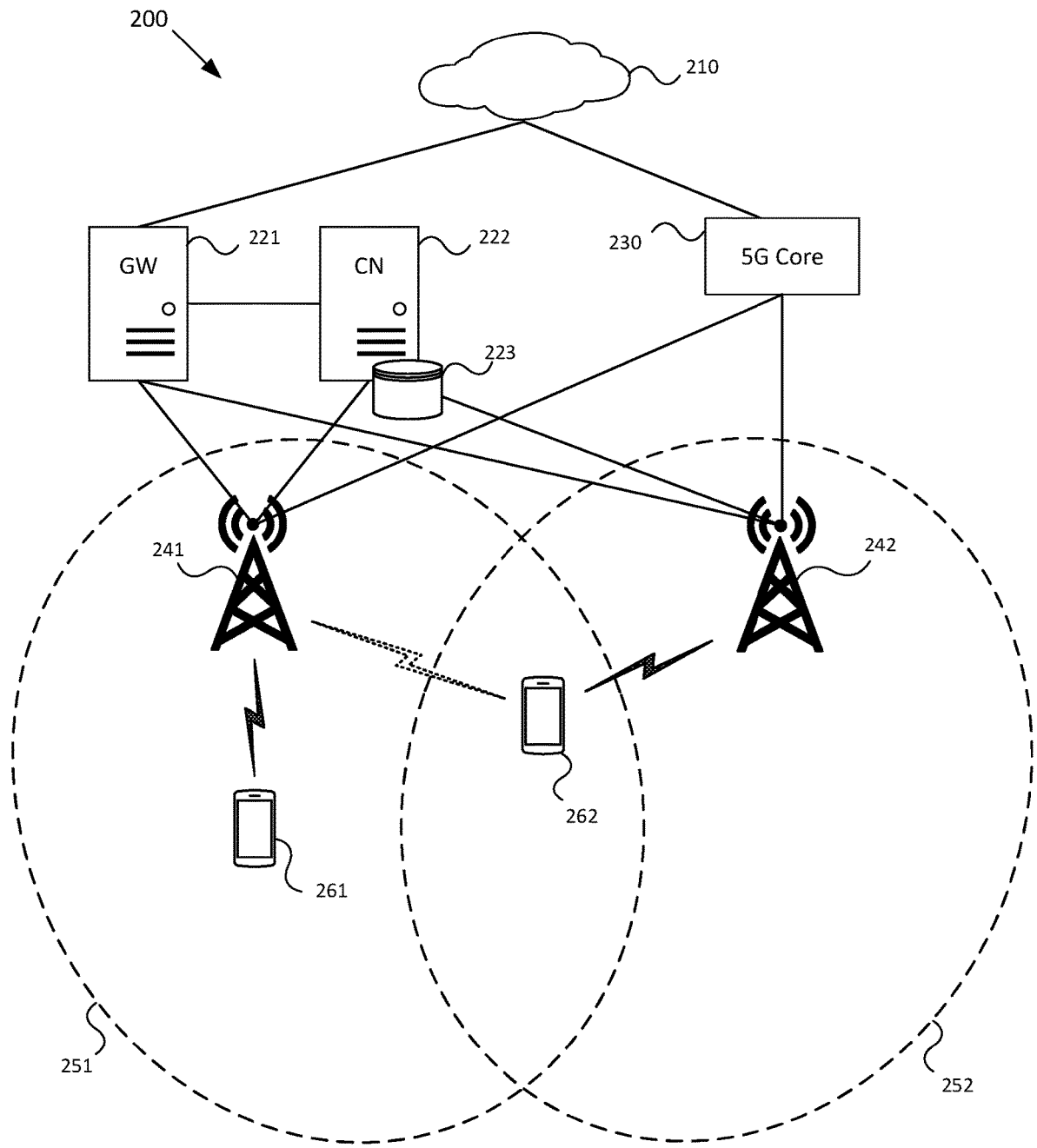
FIG. 2 illustrates an exemplary configuration of a system for wireless communication in accordance with various aspects of the present disclosure

FIG. 2 illustrates a configuration in which a system 200 provides overlapping coverage via multiple access nodes within a particular area. For purposes of illustration and explanation, the system 200 is illustrated as a combination of an LTE network and an NR network; however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a gateway node 221, a controller node 222 which includes a database 223, a 5G core 230, a first access node 241, a second access node 242, a first wireless device 261, and a second wireless device 262. For purposes of illustration and ease of explanation, only two access nodes and two wireless devices are shown in the system 200; however, as noted above with regard to FIG. 1, additional access nodes and/or additional or fewer wireless devices may be present in the system 200. In the illustration of FIG. 2, both the first access node 241 and the second access node 242 are connected to the communication network 210 via both an LTE path (including the gateway node 221) and an NR path (including the 5G core 230); however, in practical implementations one or both of the first access node 241 and the second access node 242 may be connected to the communication network 210 via only a single RAT path. In any event, the first access node and the second access node 242 communicate with the gateway node 221, the controller node 222, and/or the 5G core 230 via respective communication links, each of which may be a direct link (e.g., an X2 link or the like). The first access node 241 provides service in a first coverage area 251 and the second access node 242 provides service in a second coverage area 252, which may overlap at least in part with the first coverage area 251. While the first coverage area 251 and the second coverage area 252 are illustrated as having separate coverage areas and a common (overlapping) coverage area, in some implementations one of the first coverage area 251 and the second coverage area 252 may be subsumed within the other or the first coverage area 251 and the second coverage area 252 may be largely congruent.

A scheduling entity may be located within the first access node 241, the second access node 242, the controller node 222, and/or the 5G core 230, and may be configured to accept and deny connection requests, as will be described in more detail below. The first access node 241 and/or the second access node 242 may be any network node configured to provide communications between the connected wireless devices and the communication network 210, including standard access nodes and/or short range, lower power, small access nodes. As examples of a standard access node, the first access node 241 and/or the second access node 242 may be a macrocell access node, a base transceiver station, a radio base station, a gNodeB in 5G networks, an eNodeB in 4G/LTE networks, or the like, including combinations thereof. In one particular example, the first access node 241 and/or the second access node 242 may be a macrocell access node in which a respective range of the first coverage area 251 and/or the second coverage area 252 is from approximately five to thirty-five kilometers (km) and in which the output power is in the tens of watts (W). As examples of a small access node, the first access node 241 and/or the second access node 242 may be a microcell access node, a picocell access node, a femtocell access node, or the like, including a home gNodeB or a home eNodeB.

The first access node 241 and/or the second access node 242 can comprise one or more processors and associated circuitry to execute or direct the execution of computer-readable instructions such as those described herein. In so doing, the first access node 241 and/or the second access node 242 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the first access node 241 and/or the second access node 242 can receive instructions and other input at a user interface.

Figure 3:
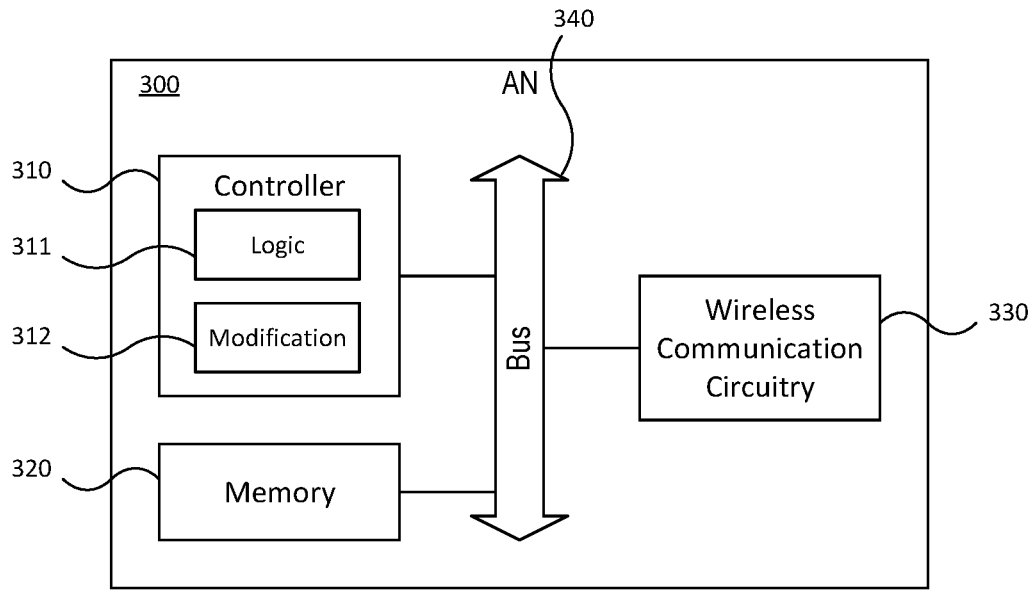
FIG. 3 illustrates an exemplary access node in accordance with various aspects of the present disclosure.

FIG. 3 illustrates one example of an access node 300, which may correspond to one or more of the access nodes 130 shown in FIG. 1 and/or the first and/or second access node 241/242 shown in FIG. 2. As illustrated the access node 300 includes a controller 310, a memory 320, wireless communication circuitry 330, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof. These sub-modules or units include a logic unit 311 (e.g., logic circuitry or a logic program) configured to perform various settings and/or determinations and a modification unit 312 (e.g., modification circuitry or a modification program) configured to perform various signal modifications.

The logic unit 311 may be configured to determine perform one or more operations comprising setting an overlap threshold (e.g., a maximum degree of overlap between the D-TDD schedules of the access node 300 and a neighboring access node, above which the two access nodes are deemed to excessively interfere); determining that the access node 300 and the neighboring access node utilize the same frequency band; comparing a first TDD allocation (e.g., schedule) corresponding to the access node 300 with a second TDD allocation corresponding to the neighboring access node, thereby to determine an overlap amount determination may also include; comparing the overlap amount to the overlap threshold, and the like.

The modification unit 312 may be configured to modify a communication signal for transmission. For example, the modification unit 312 may instruct the access node 300 to multiplex a communication signal with an orthogonal code (e.g., a code division multiplex (CDM) code) prior to transmitting the communication signal (e.g., to the connected wireless device), and/or may instruct the connected wireless device to multiplex a communication signal with an orthogonal code prior to transmitting the communication signal (e.g., to the access node 300). The modification unit 312 may also instruct the recipient device (either the connected wireless device or the access node 300) to separate the communication signal that has been multiplexed with the orthogonal code from signals that have not been multiplexed with the orthogonal code. The modification unit 312 may also instruct the recipient device to separate the orthogonal code from the received communication signal. The modification unit 312 may alternatively be configured to instruct the neighboring access node (rather than the access node 300 itself) to implement the multiplexing and demultiplexing procedures. These and other instructions may be performed in response to a determination (e.g., by the logic unit 311) that the overlap amount exceeds the overlap threshold.

In this manner, the wireless device and/or access node may be capable of distinguishing communications (e.g., communications between the first access node 241 and the first wireless device 261 of FIG. 2) from extraneous communications (e.g., communications between the second access node 242 and the second wireless device 262 of FIG. 2) even if those communications occupy the same or similar frequencies in the same link direction for one or more time slots.

The logic unit 311 and/or the modification unit 312 may physically reside within the controller 310, or may be virtual structures operable to control other components of the access node 300 to implement the above operations. For example, the modification unit 312 may be configured to itself multiplex the communication signal with the orthogonal code, or may be configured to provide a control signal to the wireless communication circuitry 330 thereby to cause the wireless communication circuitry 330 to multiplex the communication signal with the orthogonal code. Moreover, one or more of the units may instead reside within the memory 320 and/or may be provided as separate units within the access node 300. Moreover, while the logic unit 311 and the modification unit 312 are illustrated as separate units, in practical implementations some or all of the units may be combined and/or share components.

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests via the wireless communication circuitry 330 and output connection determinations via the wireless communication circuitry 330, thereby allowing or denying the connection requests. The access node 300 may include additional wireless communication circuitry elements, for example to communicate using additional frequencies and/or to provide connectivity for different RATs. The access node 300 may further include additional wired communication circuitry elements.

Figure 4:
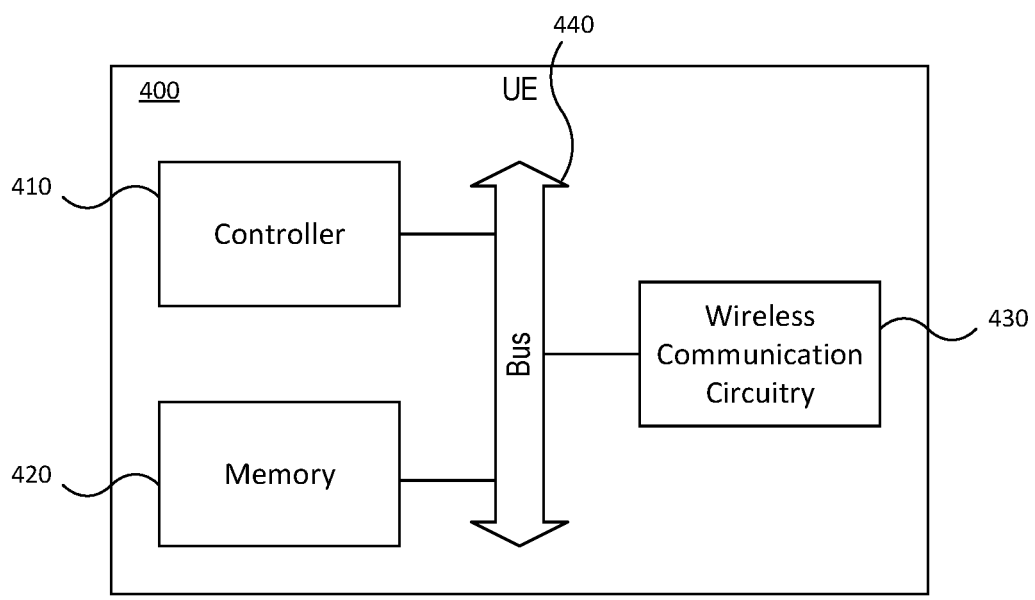
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or the first and/or second wireless devices 261/262 shown in FIG. 2. As illustrated the wireless device 400 includes a controller 410, a memory 420, a wireless communication circuitry 430, and a bus 440 through which the various elements of the wireless device 400 communicate with one another.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses via the wireless communication circuitry 430, the responses indicating whether the connection requests have been accepted or denied. The wireless device 400 may include additional wireless communication circuitry elements, for example to communicate using different RATs. The controller 410, the memory 420, and/or the wireless communication circuitry 430 may include circuit elements (e.g., a multiplexer and/or demultiplexer) or logical structures to multiplex orthogonal codes with transmitted communication signals and/or to separate the orthogonal codes from received communication signals.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the first and second wireless devices 261/262. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the first access node 241 and/or the second access node 242 to the gateway node 221, the controller node 222, and/or the 5G core 230 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links may respectively be a direct link or might include various equipment, intermediate components, systems, and networks. The communication links may comprise many different signals sharing the same link.

The gateway node 221 may be any network node configured to interface with other network nodes using various protocols. The gateway node 221 can communicate user data over the system 200. The gateway node 221 may be a standalone computing device, computing system, or network component, and can be accessible by, for example, a wired or wireless connection, or through an indirect connection such as via a computer network or communication network. The gateway node 221 may include but is not limited to a serving gateway (SGW) and/or a public data network gateway (PGW). Additionally or alternatively, the gateway node 221 may include user plane network functions (NFs), such as a User Plane Function (UPF). The gateway node 221 is not limited to any specific technology architecture, such as LTE or 5G NR, but may be used with any network architecture and/or protocol.

The gateway node 221 can comprise a processor and associated circuitry to execute or direct the execution of computer-readable instructions to obtain information. In so doing, the gateway node 221 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 221 can receive instructions and other input at a user interface.

The controller node 222 may be any network node configured to communicate and/or control information over the system 200. The controller node 222 may be configured to transmit control information associated with resource usage thresholds and/or usage parameters. The controller node 222 may be a standalone computing device, computing system, or network component, and can be accessible by, for example, a wired or wireless connection, or through an indirect connection such as via a computer network or communication network. The controller node 222 may include but is not limited to an MME, a HSS, a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 222 may comprise user plane NFs and/or control plane NFs, including but not limited to a Core Access and Mobility management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 222 is not limited to any specific technology architecture, such as LTE or 5G NR, but may be used with any network architecture and/or protocol.

The controller node 222 can comprise a processor and associated circuitry to execute or direct the execution of computer-readable instructions to obtain information. In so doing, the controller node 222 can retrieve and execute software from storage, which can include a disk drive, a flash drive, memory circuitry, or some other memory device, and which may be local or remotely accessible. As illustrated in FIG. 2, the controller node 222 includes the database 223 for storing information, such as predetermined resource usage thresholds utilized for dynamically managing RATs of the first and second wireless devices 261/262, as well as positions and/or characteristics of the first and second wireless devices 261/262. The database 223 may further store handover thresholds, scheduling schemes, and resource allocations for the first and/or access node 241/242, the first and/or second wireless devices 261/262, and so on. This information may be requested or shared with the first and/or second access node 241/242 via the corresponding communication link, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 222 can receive instructions and other input at a user interface.

Moreover, the communication network 210, the first access node 241, the second access node 242, and/or the 5G core 230 may collectively implement several control plane NFs and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 230. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 230, thereby terminating RAN control plane and UE traffic originating on either the N1 or N2 reference interface. In the 5G core 230, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the first access node 241 and/or the second access node 242 and communication network 210.

As illustrated in FIG. 2, the first wireless device 261 is the first coverage area 251 but not the second coverage area 252 and thus communicates with the first access node 241. The second wireless device 262 is in both the first coverage area 251 and the second coverage area 252 (the "common coverage area") but, as illustrated, has a stronger, faster, and/or more efficient connection to the second access node 242. Therefore, the second wireless device 262 communicates with the second access node 242. However, because the second wireless device 262 is in the common coverage area, transmissions originating from the second wireless device 262 may cause interference at the first access node 241, as shown by the dotted-line connection in the event that said transmissions are scheduled utilizing the same frequency band in the same link direction, for example in a D-TDD scheme. To mitigate or eliminate this interference, one or more device (i.e., one or more of the first access node 241, the second access node 242, the first wireless device 261, and/or the second wireless device 262) may implement an orthogonal coding scheme. One example of such interference is illustrated in FIG. 5, and one example of an implementation of an orthogonal coding scheme is illustrated in FIG. 6.

Figure 5:
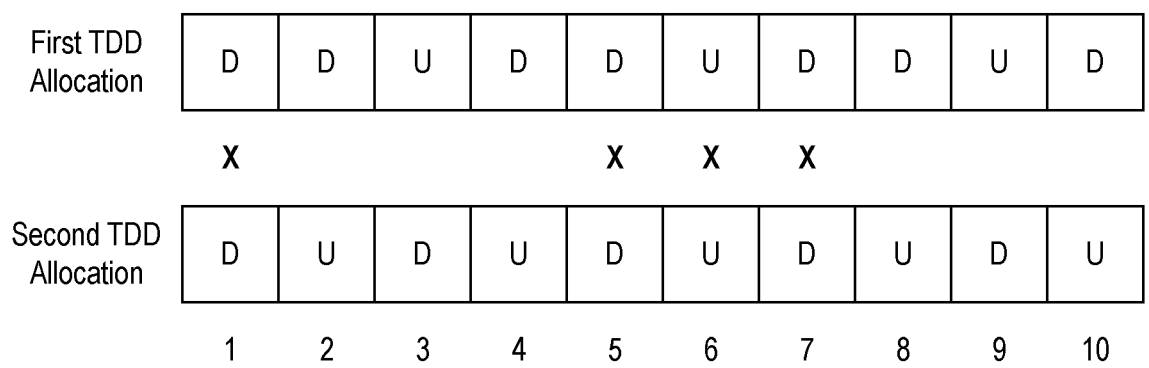
FIG. 5 illustrates exemplary time-divisional duplexing schedules in accordance with various aspects of the present disclosure.

In FIG. 5, two access nodes in the same geographical area (e.g., the first access node 241 and the second access node 242) provide service on the same set of frequencies. The two access nodes are asynchronous (i.e., do not have identical TDD allocations). FIG. 5 provides a snapshot of respective TDD allocations (e.g., D-TDD allocations) for both of the access nodes over a series of ten timeslots. The first TDD allocation, which corresponds to one of the two access nodes in the geographical area, follows a repeating pattern of two downlink slots followed by one uplink slot. The second TDD allocation, which corresponds to the other of the two access nodes in the geographical area, follows a repeating pattern of one downlink slot followed by one uplink slot. Thus, FIG. 5 may illustrate an example of a time period in which the one access node has a higher proportion of downlink traffic while the other access node has a higher proportion of uplink traffic, relative to one another. In FIG. 5, for four of the ten timeslots both of the access nodes are utilizing the same frequency band in the same link direction at the same time, and thus may potentially present interference challenges. These timeslots are marked with an X.

Figure 6:
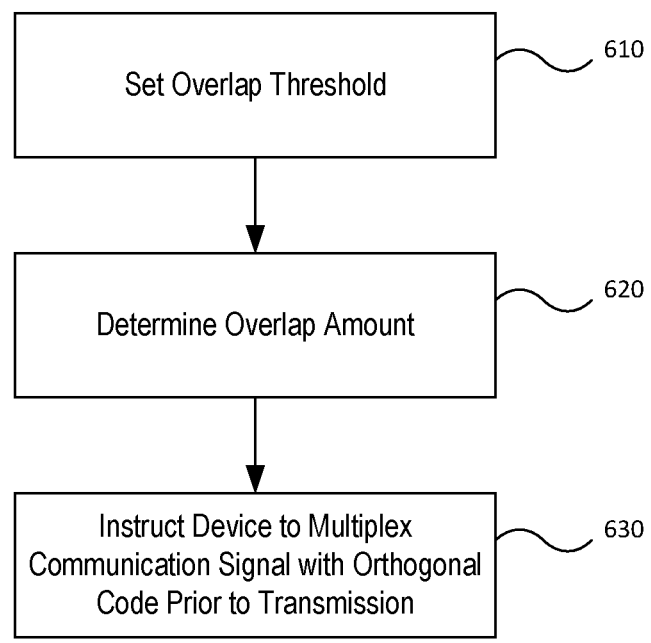
FIG. 6 illustrates an exemplary process flow for duplex communication in accordance with various aspects of the present disclosure

FIG. 6 illustrates an exemplary process flow for duplexing communications in a network, which may mitigate or eliminate interference caused by the TDD allocation collision illustrated in FIG. 5. The operations of FIG. 6 will be described as being performed by an access node (e.g., the access node 300 described above), but may in practical implementations be performed by any other network component.

FIG. 6 begins with an operation 610 of setting an overlap threshold. The overlap threshold may correspond to a maximum degree of overlap between the TDD allocations of the access node implementing the process flow and a neighboring access node, above which the two access nodes are deemed to excessively interfere. The overlap threshold may refer to a percentage of timeslots for which the two access nodes are utilizing the same frequency band in the same link direction at the same time. The overlap threshold may be predetermined by a network operator, and in some implementations may be performed in advance (i.e., prior to and in a different process than the remaining operations of FIG. 6).

At operation 620, the overlap amount between the TDD allocations of the two access nodes are determined. Operation 620 may include first determining that the two access nodes utilize the same frequency band, because the TDD allocations may be considered to have an overlap of zero if they are applied on different frequency bands. Operation 620 may include directly determining the overlap, such as by comparing the uplink/downlink schedule of the two TDD allocations (e.g., as illustrated in FIG. 5) on a timeslot-by-timeslot basis, a subframe-by-subframe basis, a frame-by-frame basis, as a percentage of overall time, and so on. Operation 620 may additionally or alternatively include inferring the overlap, such as by determining (e.g., measuring) an interference level between one or both access nodes and the wireless devices connected thereto.

At operation 630, one or more devices are instructed to multiplex communication signals with an orthogonal code prior to transmission. Operation 630 may be performed in response to a comparison of the overlap threshold, set in operation 610, and the overlap amount, determined in operation 620. For example, operation 630 may be performed when it is determined that the overlap amount exceeds the overlap threshold. Operation 630 may include instructing one access node of the two neighboring access nodes to multiplex downlink communication signals with the orthogonal code prior to transmitting the downlink communication signals and/or instructing one or more wireless devices connected to the one access node (e.g., all connected wireless devices) to multiplex uplink communication signals with the orthogonal code prior to transmitting the uplink communication signals. Operation 630 may also include instructing the one access node of the two neighboring access nodes to demultiplex (i.e., separate) uplink communication signals from the orthogonal code upon receiving the uplink communication signals and/or instructing the one or more wireless devices connected to the one access node (e.g., all connected wireless devices) to demultiplex downlink communication signals from the orthogonal code upon receiving the downlink communication signals. Operation 630 may also include instructing the one access node of the two neighboring access nodes and/or instructing the one or more wireless devices connected to the one access node (e.g., all connected wireless devices) to ignore communication signals which have not been multiplexed with the orthogonal code.

The access node instructed in operation 630 is not necessarily the same access node which performs the operations of FIG. 6, and in some implementations an access node may be configured to instruct another access node to implement the multiplexing/demultiplexing operations. Moreover, multiple access nodes or sets of connected wireless devices may be instructed to implement different coding schemes. For example, one access node of the neighboring access node and its connected wireless devices may be instructed to apply a coding scheme using one orthogonal code, while the other access node may be instructed to apply another coding scheme using a different orthogonal code.

In some implementations, operation 610 may be performed once for a given period of time (e.g., one day) and operations 610 and 630 may be performed at a smaller interval (e.g., once every fifteen minutes), which may be a predetermined interval. Moreover, the operations of FIG. 6 may be applied when the two access nodes implement the same RAT (e.g., both LTE or both NR) or when the two access nodes implement different RATs (e.g., one LTE and one NR).

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of duplexing communications in a network, comprising:
setting an overlap threshold;
comparing a first time division duplex (TDD) allocation corresponding to a first access node with a second TDD allocation corresponding to a second access node which neighbors the first access node and which utilizes a same frequency band as the first access node, thereby to determine an overlap amount, wherein the first and second TDD allocations comprise asynchronous allocations and wherein overlap occurs in the asynchronous allocations where the first access node and the second access node are utilizing the same frequency band in a same link direction at a same time; and
in response to a determination that the overlap amount exceeds the overlap threshold, instructing the first access node to apply an orthogonal code to a plurality of downlink communication signals prior to transmitting the plurality downlink communication signals to respective ones of a plurality of wireless devices that are connected to the first access node, wherein the orthogonal code is applied to the plurality of downlink communication signals for a predetermined period of time before the application of the orthogonal code is stopped.

2. The method according to claim 1, wherein comparing the first TDD allocation to the second TDD allocation includes comparing an uplink/downlink schedule of the first TDD allocation with an uplink/downlink schedule of the second TDD allocation on a slot-by-slot basis, a subframe-by-subframe basis, or a frame-by-frame basis.

3. The method according to claim 1, wherein comparing the first TDD allocation to the second TDD allocation includes determining an interference level for a communication between the first access node and one of the plurality of wireless devices.

4. The method according to claim 1, further comprising:
in response to the determination that the overlap amount exceeds the overlap threshold, instructing the plurality of wireless devices to multiply respective uplink communication signals by the orthogonal code prior to transmitting the uplink communication signals.

5. The method according to claim 1, further comprising:
in response to the determination that the overlap amount exceeds the overlap threshold, instructing the first access node to separate the orthogonal code from an uplink communication signal after receiving the uplink communication signal from one of the plurality of wireless devices.

6. The method according to claim 1, further comprising:
repeatedly performing the comparing at a predetermined interval.

7. The method according to claim 1, wherein the orthogonal code is a code division multiplexing (CDM) code.

8. The method according to claim 1, wherein the overlap threshold is predetermined by a network operator.

9. A system for duplex communication in a network, comprising:
   a processing node; and
   a processor coupled to the processing node, the processor being configured to perform operations comprising:
      setting an overlap threshold;
      determining that a first access node and a second access node utilize a same frequency band;
      determining an overlap amount between a first time division duplex (TDD) allocation corresponding to the first access node and a second TDD allocation corresponding to the second access node, wherein the first and second TDD allocations comprise asynchronous allocations and wherein overlap occurs in the asynchronous allocations where the first access node and the second access node are utilizing the same frequency band in a same link direction at a same time;
      comparing the overlap amount to the overlap threshold; and
      in response to a determination that the overlap amount exceeds the overlap threshold, instructing the first access node to multiplex a downlink communication signal with an orthogonal code for communications between the first access node and a plurality of wireless devices connected to the first access node, wherein the downlink communication signal is multiplexed with the orthogonal code for a predetermined period of time before the multiplexing with the orthogonal code is stopped.

10. The system according to claim 9, wherein determining the overlap amount includes determining an amount of time during which the first access node and the second access node communicate in the same direction.

11. The system according to claim 9, wherein determining the overlap amount includes determining an interference level for a communication between the first access node and one of the plurality of wireless devices connected to the first access node.

12. The system according to claim 9, wherein one of the at least one of the first access node or the second access node communicate using a first radio access technology.

13. The system according to claim 9, wherein one of the at least one of the first access node or the second access node communicate using a second radio access technology.

14. The system according to claim 9, the operations further comprising:
   in response to the determination that the overlap amount exceeds the overlap threshold, instructing the first access node to separate the orthogonal code from an uplink communication signal after receiving the uplink communication signal from one of more of the plurality of wireless devices connected to the first access node.

15. The system according to claim 9, wherein the orthogonal code is a code division multiplexing (CDM) code.

16. A processing node for managing duplex communications in a network, the processing node being configured to perform operations comprising:
   comparing a first time division duplex (TDD) allocation corresponding to a first access node with a second TDD allocation corresponding to a second access node which neighbors the first access node and which utilizes a same frequency band as the first access node, thereby to determine an overlap amount, wherein the first and second TDD allocations comprise asynchronous allocations and wherein overlap occurs in the asynchronous allocations where the first access node and the second access node are utilizing the same frequency band in a same link direction at a same time; and
   in response to a determination that the overlap amount exceeds an overlap threshold, instructing the first access node to multiplex a downlink communication signal with an orthogonal code prior to transmitting the downlink communication signal, wherein the downlink communication signal is multiplexed with the orthogonal code for a predetermined period of time before the multiplexing with the orthogonal code is stopped, wherein the orthogonal code is common to each of a plurality of wireless devices connected to the first access node.

17. The processing node according to claim 16, wherein comparing the first TDD allocation to the second TDD allocation includes comparing an uplink/downlink allocation of the first TDD allocation with an uplink/downlink allocation of the second TDD allocation on a slot-by-slot basis, a subframe-by-subframe basis, or a frame-by-frame basis.

18. The processing node according to claim 16, wherein comparing the first TDD allocation to the second TDD allocation includes determining an interference level for a communication between the first access node and a respective wireless device of the plurality of wireless devices.

19. The processing node according to claim 16, wherein the orthogonal code is a code division multiplexing (CDM) code.

20. The processing node according to claim 16, wherein the first access node and the second access node are asynchronous.

* * * * *